F. E. OILER.
MOTION PICTURE APPARATUS.
APPLICATION FILED APR. 25, 1918.
1,305,002.
Patented May 27, 1919.
2 SHEETS—SHEET 1.
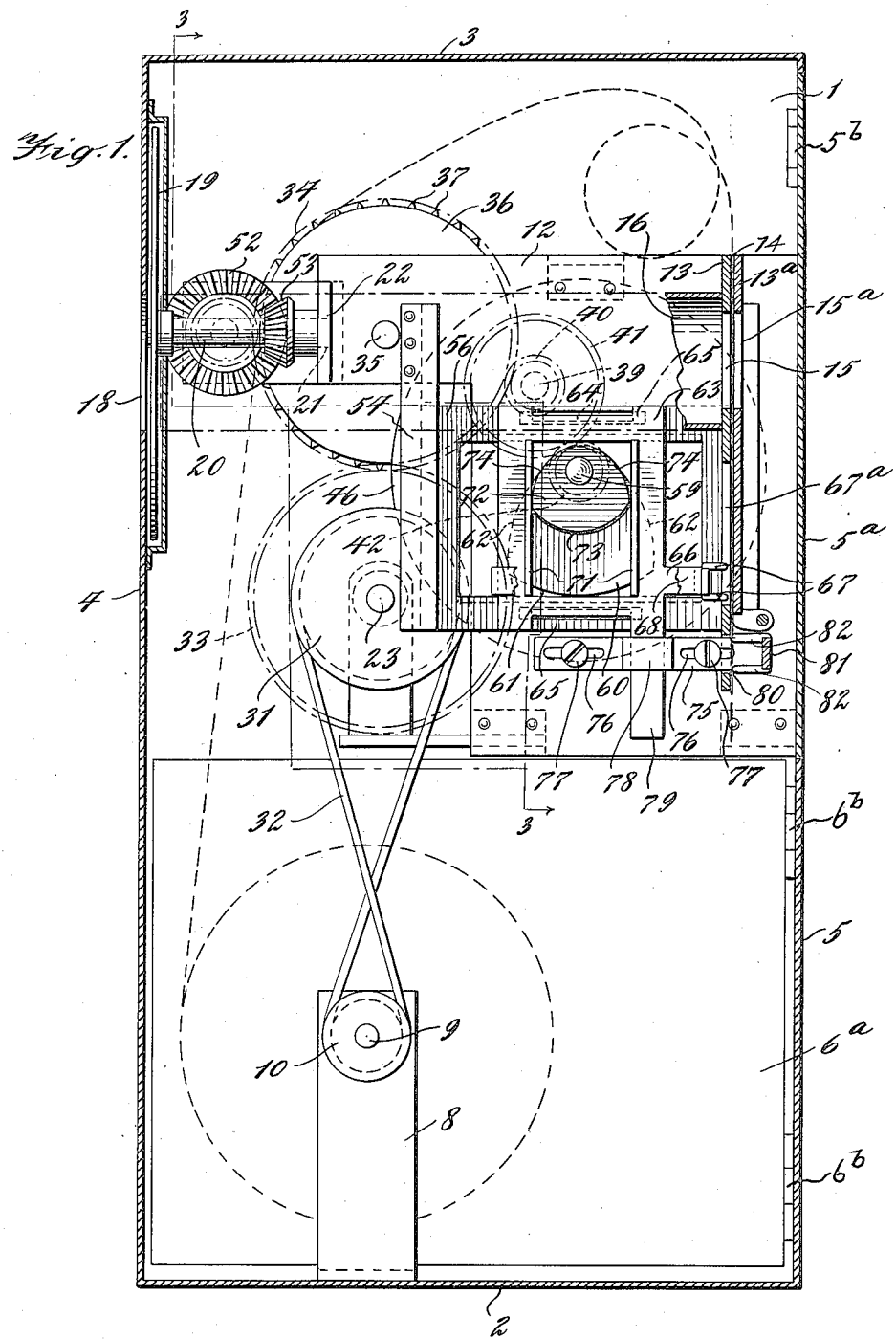
WITNESS
INVENTOR
Frank E. Oiler
BY
Gifford & Bull
his ATTORNEYS

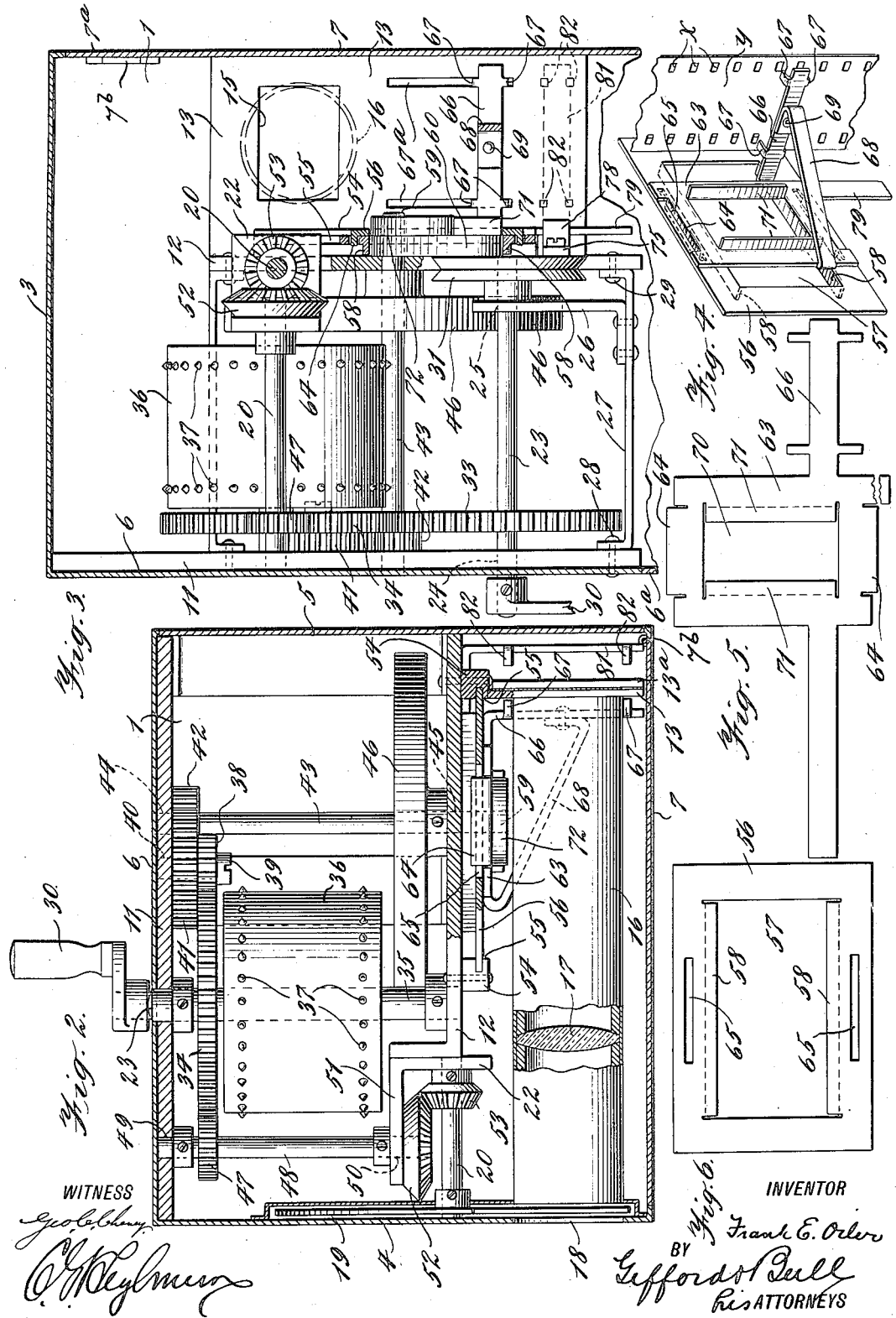

UNITED STATES PATENT OFFICE.

FRANK E. OILER, OF NEW YORK, N. Y., ASSIGNOR TO JAY EDWARD BOECK, OF NEW YORK, N. Y., AND SAMUEL E. DETTELBACH, OF CLEVELAND, OHIO.

MOTION-PICTURE APPARATUS.

1,305,002.            Specification of Letters Patent.      Patented May 27, 1919.

Application filed April 25, 1918. Serial No. 230,774.

*To all whom it may concern:*

Be it known that I, FRANK E. OILER, a citizen of the United States, residing at New York city, borough of Manhattan, county of New York, and State of New York, have invented certain new and useful Improvements in Motion-Picture Apparatus, of which the following is a specification.

My invention relates to new and useful improvements in film feeding means for feeding motion picture film, particularly of that character or type provided along its longitudinal edges, with equally spaced apertures adapted to be engaged by the feeding means. The invention is adapted for use in connection with motion picture cameras, motion picture projecting apparatus, and in fact, in any situation wherein it is desired to provide a step-by-step, or intermittent feed to a motion picture film.

The invention consists in the new and useful construction and combination of parts, to be more fully described hereinafter, and the novelty of which will be particularly pointed out and distinctly claimed.

I have fully and clearly illustrated my invention in the accompanying drawings to be taken as a part of this specification, and wherein—

Figure 1 is a view in side elevation of a motion picture camera and projecting apparatus with one side of the casing removed, and disclosing therein the camera mechanism in side elevation, partly in section, and with my improved film feeding mechanism applied thereto.

Fig. 2 is a horizontal or transverse section through the casing and the apparatus shown in Fig. 1, and showing the internal mechanism and the feeding mechanism constituting my invention in a top plan view.

Fig. 3 is a sectional view through the apparatus shown in Fig. 1 on the line 3—3 of said Fig. 1, and showing the internal mechanism and my invention viewed from the left of Fig. 1.

Fig. 4 is a detailed perspective view of the portion of the feeding mechanism constituting my invention.

Figs. 5 and 6 are detailed plan views of the stampings from which the members shown in Fig. 4 are made.

Before proceeding with the detailed description of my invention, I desire it understood that while I have shown it as applied to a device capable of use as a combined camera and projecting apparatus, it is not limited to such use, but may be applied as heretofore stated, to either a camera, a projecting apparatus, or any other apparatus in which it is desired to impart a step-by-step or intermittent motion to a film, without departing from the scope of the invention.

Referring to the drawings by characters of reference, 1 designates generally a containing casing adapted to receive and contain parts for feeding motion picture film, and for exposing the same to light in order to produce negatives in sequence thereon. This casing may be of a variety of forms, but I prefer that it consist of a rectangular, oblong body comprising a bottom wall 2, a top wall 3, front and rear walls 4, 5, respectively, and side walls 6, 7. The upper portion of the rear wall 5 is provided with a removable closure panel $5^a$, of any suitable form, hinged as at $5^b$, which is light-tight, the lower portion of the side walls 6 is provided with a removable panel $6^a$, hinged as at $6^b$, and the wall 7 is preferably made removable in its entirety as at $7^a$, being hinged as at $7^b$. It will be understood that these removable portions of the walls may be constructed in any suitable manner so as to be light-tight, and so as to be held securely in closed position.

On the bottom wall of the casing is a vertically extending U-shaped bracket comprising spaced side members 8, in the upper ends of which is journaled a horizontally disposed shaft 9, adapted to receive on its end portions spools carrying the film, one of said spools being that carrying the unexposed film, and the other the exposed film when the apparatus is being used as a camera. On the shaft 9, and preferably between the bracket arms 8, is a grooved pulley 10 rigidly secured to the shaft in any suitable manner, and adapted to receive a transmission band or strap in order to rotate the shaft and the spools thereon, in a manner to be presently described.

Mounted in the casing above the film spool support, is the apparatus for exposing films, in order to make the pictures, or for projecting pictures, and having my invention applied thereto for feeding the film.

I will now proceed to describe this apparatus and my invention applied thereto.

11, 12 designate frame members consisting of vertically-disposed vertical, spaced plates, the plate 11 being secured adjacent the side wall 6, and the plate 12 being secured in position at a point intermediate said side wall 6 and the other side wall 7, (see Figs. 2 and 3.) Supported by the plate 12 and bridging the space between said plate and the side wall 7, is a pair of vertically disposed plate members 13, 13ª, spaced apart from each other to provide a film guide, or chute, or gate 14. It will be noted that these plates 13, 13ª, are arranged in planes at right angles to the said plate 12, and said plates 13, 13ª are provided with registering rectangular apertures 15, 15ª, connecting with a horizontally disposed lens barrel 16 containing a lens shown generally at 17, and opening at its opposite end through an aperture 18 in the wall 2 of the casing. It will be understood that the light shaft entering the opening in the wall 2 can pass through the lens barrel and strike that part of the film exposed through the opening 15 in the adjacent film guide. The opening 15ª through the plate 13ª permits use of the apparatus for projecting purposes, by merely opening the closure 5ª and properly adjusting a suitable illuminating medium before the plate 13ª. Coöperating with the open end of the lens barrel is a rotary shutter 19, arranged inside the casing and mounted on a shutter shaft 20 mounted in a bearing 21 on a bracket 22, carried by the plate 12, heretofore described. The means for rotating the shutter shaft, and shutter, will be presently described.

I will now describe the film feeding means for feeding the film from the supply spool to the film guide formed by the plates 13, 13ª. This means preferably consists of a horizontally disposed shaft 23 journaled in a bearing 24 in the said plate 11, and a bearing 25 in a vertical bracket member 26 rigidly secured to a horizontal frame member 27, rigidly connected to the lower portions of the plates 11 and 12, respectively, as at 28, 29. The shaft 23 is adapted to be rotated by a hand crank 30 mounted on one end of said shaft outside the casing, and rigidly secured to said shaft, as shown in Figs. 2 and 3. The inner end of the shaft 23 carries a grooved belt wheel 31 connected by a driving belt 32, with the pulley 10, heretofore described, whereby the shaft 9 is positively driven to cause the take-up spool to receive the exposed film, if the device is used as a camera, or the projected film, if the device is used as a projector. On the shaft 23 is mounted a gear 33, which meshes with a gear 34, rigidly connected to a horizontal shaft 35 which carries thereon a feed drum 36, provided with properly spaced pins 37 adapted to enter apertures in the longitudinal side edges of a film, and to thereby serve to draw the latter from the film supply spool mounted on the shaft 9. The gear 34 meshes with a pinion 38, mounted on a stud shaft 39, having suitable bearing, as at 40 in the side plate 11, said shaft 39 also carrying a gear 41 which meshes with a pinion 42 on a horizontally disposed shaft 43, journaled as at 44, 45 in the plates 11 and 12, respectively. The shaft 43 carries a fly wheel 46 which operates to insure a steady and even movement of the driving mechanism. I desire it understood that my invention is not limited to the feeding mechanism so far described, as the latter is merely an embodiment of one means which may be employed in connection with my invention.

I will now describe the mechanism for operating the shutter 19, heretofore described. The gear 34 on the shaft 35 meshes with a pinion 47 fixed on a horizontally disposed shaft 48, one end of which has a bearing, as at 49, in the said plate 11, while the other end has a bearing 50, in a bracket arm 51, rigidly secured in any suitable manner to the plate 12. The shaft 48 projects beyond the bracket member 51 and carries a beveled pinion 52, which meshes with a beveled pinion 53 fixed to the said shutter shaft 20, heretofore described. The gearing, heretofore described, is so proportioned that the shutter makes two revolutions to one revolution of the shaft 48, and preferably eight revolutions to each turn of the said shaft 23.

I will now proceed to describe the improved means for imparting an intermittent feed to the film passing through the film chute or guide constituted by the plates 13, 13ª: Rigidly secured preferably to the side of the plate 12, opposite to that nearest the gearing, heretofore described, are spaced vertical guide-ways 54, provided respectively on their inner faces, which face each other, with vertical grooves 55, which receive a vertically disposed reciprocating member, preferably in the form of a rectangular plate 56, having a rectangular opening 57, preferably oblong, and provided along its upper and lower edges with horizontal flanges 58 parallel to each other and extending horizontally. The plate member 56 preferably lies and moves in a plane substantially at right angles to the plane of the film. One end of the shaft 43 is projected through plate 12, as at 59, and carries a cam 60 of such form, as when rotated, will engage the upper and lower edges of the oblong opening 57, i. e., the flanges 58, to impart a vertical reciprocatory movement of the said member 56, and also preferably to hold said plate with a period of dwell at its uppermost and lowermost positions. For this purpose, the cam may have an arcuate concentric portion 61, and opposite similar eccentric portions 62 (see Fig. 1), the arcuate concentric portion serving to hold the plate during its periods of dwell at its limits of movement, and the surfaces 62 serving to raise and lower the said plate. The function of the cam is to impart to the said member 56 a reciprocatory motion in a direction substantially parallel to the direction of film feed.

The member 56 and the opening 57 therein, are so proportioned or dimensioned with reference to the cam 60, that the latter only contacts the upper and lower horizontal edges of the opening 57, so that said member 56 is not moved by the cam toward the film, but is moved only in a vertical direction, i. e., in a direction substantially parallel to the direction of travel of the film.

Mounted on, and carried by the member 56, is a film engaging member adapted to be engaged with the film to feed the same lengthwise when the member 56 is moved in the film feeding direction, and to be disengaged from the film when said member 56 is moved counter to the film feeding direction. This engaging member preferably consists of a plate 63, lying preferably in a plane parallel to that of the plate 56, and having upper and lower horizontal flanges 64 which are seated in horizontal slots 65, in the upper and lower edge portions of the member 56. The flanges 64 are of less length than the slots 65 in which they are seated, so that the engaging member 63 may have a limited reciprocatory movement relative to the plate 56, and toward and away from the film guide 14. Preferably integral with the plate 63 is an arm 66 standing at right angles to the plane of the plate 63, and in a plane parallel to that occupied by the film, said arm 66 carrying pairs of projections 67 adapted to enter the side openings x in a film strip y, (see Fig. 4). The arm 66 is held rigidly in position by a brace 68, preferably integral with the member 63, and secured to said arm 66, as at 69, in any suitable manner.

The plate 63 is provided with a rectangular opening 70, preferably bounded on its vertical side edges by flanges 71, preferably struck up from the plate 63, and standing at right angles to the plane of said plate. Means is provided for reciprocating the film engaging member 63 in a line at right angles to the direction of the film feed, so that when the member 56 is in its uppermost position, the member 63 will be advanced to have the projections 67 enter the openings x in the film, and be held therein during the movement of the member 56 in the film feeding direction, whereupon said member 63 will be moved to cause the projections 67 to be withdrawn from the film openings x, and the member 63 carried to initial position when the member 56 moves counter to the film feeding direction. The means for causing this movement, preferably consists of a substantially triangular cam 72, mounted on the end 59 of the shaft 43, said cam having a concentric arcuate portion 73, and eccentric curved portions 74. The arrangement is such, that the faces 74 of the cam 72 operate to reciprocate the engaging member 63 toward and away from the film, while the face 73 holds the engaging member for a period of dwell, when the engaging member is moved in the film feeding direction, and also when the said member is disengaged from the film and is being moved to initial position with the member 56.

Means is provided for holding the film stationary, while the member 56 and the engaging member 63 are being moved in a direction counter to the film feed. This holding means preferably consists of a reciprocating member 75, having slots 76 to receive holding screws 77 threaded into the plate 12, said member 75 having a recessed portion 78 adapted to slidingly receive a projection 79, preferably integral with the member 63. At its end toward the film, said member 75 is projected through an opening 80 in the lower end of the plate 13, and said projecting end is provided with a lateral arm 81 provided with spaced upper and lower projections 82 adapted to enter the film openings x from the opposite side of the film upon which the member 66 is located. The arrangement is such, that when the member 66 is moved to have the projections 67 inserted in the film openings, the said member 81 is moved away from the film to disengage the projections 82 from the openings x to permit feed of the film, but when the member 66 is moved away from the film to disengage the projections 67 therefrom, the arm 79 operates said member 75 to draw the arm 81 toward the film, and cause the projections 82 to enter the film openings x, and thereby hold the film while the engaging member 63 moves to initial position to be engaged with the film.

It will be noted that the projections 67 extend through vertical parallel slots 67ª in the plate 13, so as to enter the openings in the film.

The parts being constructed as shown in the preferred embodiment described herein, the operation is as follows, referring particularly to Fig. 1 of the drawings:

The hand crank 30 is operated to turn the shaft 23, and motion is hereby transmitted through the gearing to the shaft 43, carrying the cams 60 and 72. The rotation of the said cams causes the eccentric face 62 of the cam 60, appearing to the left in Fig. 1, to engage the upper horizontal flange 58 of the member 56, to lift said member 56 vertically, and the concentric surface 73 of the cam 72 engages the left hand flange 71 of the member 63, to hold said member retracted or disengaged from the film, said member 63 being lifted with the member 56 while held in this retracted position. When the member 56 reaches its uppermost position, the surface 61 of the cam 60 will engage the upper flange 58 on the member 56, and hold the said member 56 for a period of dwell, during which period the eccentric surface 74, to the left of the cam 72, in Fig. 1, will engage the right hand flange 71 on the member 63, to move said member 63 toward the film, and cause the projections 67 to enter the film openings $x$. As soon as the projections 67 have entered the film openings, the eccentric surface 62, on the cam 60, opposite to that heretofore mentioned, will be presented to the said upper flange 58, and said first mentioned eccentric surface 62 be presented to the lower flange 58, so that the member 56 will be moved in the film feeding direction, carrying with it the member 63, and consequently feeding the film forward, the concentric surface 73, of the cam 72, holding the film engaging member 63 in position to maintain the projections 67 in engagement with the film throughout the downward movement of the member 56. When the member 56 reaches its lowermost position, the concentric surface 61, of the cam 60, will hold said member for a period of dwell, during which period the cam 72 will operate to retract the engaging member 63 to the position shown in Fig. 1, whereupon continued revolution of the cams repeats the motions heretofore described.

When the member 63 is retracted, as shown in Fig. 1, the film holding member 75 is operated, that is, moved to the left, in Fig. 1, to cause the projections 82 to enter the film openings and hold or lock the film while the member 56 and the member 63 are returned to initial position. When the said members 56 and 63 are returned to initial or uppermost position, and the member 63 is moved toward the film, the holding member 75 is moved to the right, in Fig. 1, so that the projections 82 are moved out of the film to permit the latter to be fed, when the members 56 and 63 are moved to feed the film.

It will be seen that I have provided a simple and effective film feed, which has the advantage that the film engaging projections 67 are moved into engagement with the film, and out of engagement therewith in directions at right angles to the plane of the film, so that said projections are not liable to tear or wear the edges of the openings in the film, and thereby enlarge or distort said openings, which would result in improper feed of the film, and the spacing of the pictures on the film, both when the film is exposed in the device as a camera, or when the pictures are projected.

It will be noted that the film supplying mechanism consists of the gearing, and the drum 36 is located on one side of the casing, while the film feeding means is located on the other side, and in order that the film will be properly presented to the chute formed by the plates 13, 13ª, the film is turned over or looped, as indicated in dash lines in Fig. 1 which provides for the proper presentation of the film from the supply means to the feeding means without twisting or creasing the film.

If it is desired to use the apparatus as a camera, the door 5ª is closed, in which event, the apparatus may be utilized as a camera, in a manner which will be understood without further description. If the device is to be used as a projector, it is only necessary to place the spool carrying the exposed film on the spool shaft 9, open the door 5ª, and arrange a proper illuminating medium in line with the openings 15, and the lens tube, so as to project a beam of light through the film and the lens tube.

What I claim and desire to secure by Letters Patent of the United States is—

1. In a motion picture apparatus, a film guide, a member reciprocable lengthwise of the film, a reciprocatory film-engaging member carried by said first-named member and movable toward and away from the film at the limits of movement of the first-named member, means for reciprocating said member, and a film-locking device operating to hold the film when the film-engaging means is disengaged from the film.

2. In a motion picture apparatus, a film guide, a member reciprocable lengthwise of the film, a reciprocatory film-engaging member carried by said first-named member and movable toward and away from the film at the limits of movement of the first-named member, means for reciprocating said members, and a film-holding device operable by the film-engaging means to hold the film when said film-engaging means is disengaged from the film.

3. In a motion picture apparatus, a film guide, a member reciprocable lengthwise of the film, a reciprocatory member carried by said first-named member and having an arm having projections adapted to coöperate with openings in a film, means for engaging the film to hold the same when said projections are disengaged therefrom, and to be free from the film when the projections are engaged with the film, means for reciprocating said first-named member, and means for moving said second-named member toward the film at one limit of movement of the first-named member, and away from the film at the other limit of movement of said first-named member.

4. In a motion picture apparatus, a film guide, a member reciprocable lengthwise of the film, a reciprocatory member carried by said first-named member, a film-engaging arm on said second member and having projections to coöperate with openings in a film and movable with said reciprocatory member toward and away from the film at the limits of movement of said first-named member, means for reciprocating said members, and means associated with said second member for locking the film when the film-engaging arm is disengaged from the film.

5. In a motion picture apparatus, a film guide, a member reciprocable lengthwise of the film, a reciprocatory member carried by said first-named member, a film-engaging arm on said second member and having projections to coöperate with openings in a film and movable with said reciprocatory member toward and away from the film at the limits of movement of said first-named member, means for reciprocating said members, and a reciprocating member associated with said second member and provided with means for locking the film in position when the film-engaging member is disengaged therefrom.

6. In a motion picture apparatus, a film guide, a member reciprocable lengthwise of the film, a reciprocatory member carried by said first-named member, a film-engaging arm on said second member and having projections to coöperate with openings in a film and movable with said reciprocatory member toward and away from the film at the limits of movement of said first-named member, means for reciprocating said members, and a reciprocating member extending to the opposite side of the film from the film-engaging member for locking the film in position when the film-engaging member is disengaged therefrom.

7. In a motion picture apparatus, a film guide, a member reciprocable lengthwise of the film, a reciprocatory member carried by said first-named member, a film-engaging arm on said second member and having projections to coöperate with openings in a film and movable with said reciprocatory member toward and away from the film at the limits of movement of said first-named member, means for reciprocating said members, and a reciprocating member extending to the opposite side of the film and provided with projections for engaging the film openings and locking the film in position when the film-engaging member is disengaged therefrom.

In testimony whereof I have hereunto signed my name in the presence of two subscribing witnesses.

FRANK E. OILER.

Witnesses:
C. G. HEYLMUR,
E. M. LOCKWOOD.